(12) United States Patent
Donnig

(10) Patent No.: US 11,565,817 B2
(45) Date of Patent: Jan. 31, 2023

(54) AIRCRAFT SEAT, AIRCRAFT SEAT ARRANGEMENT HAVING AN AIRCRAFT SEAT, AND AIRCRAFT HAVING AN AIRCRAFT SEAT ARRANGEMENT

(71) Applicant: AIRBUS OPERATIONS GMBH, Hamburg (DE)

(72) Inventor: Uwe Donnig, Cuxhaven (DE)

(73) Assignee: Airbus Operations GmbH, Hamburg (DE)

( * ) Notice: Subject to any disclaimer, the term of this patent is extended or adjusted under 35 U.S.C. 154(b) by 350 days.

(21) Appl. No.: 16/832,315

(22) Filed: Mar. 27, 2020

(65) Prior Publication Data
US 2020/0307803 A1 Oct. 1, 2020

(30) Foreign Application Priority Data
Mar. 29, 2019 (DE) ...................... 10 2019 108 218.8

(51) Int. Cl.
*B64D 11/06* (2006.01)
*H02J 4/00* (2006.01)

(52) U.S. Cl.
CPC ............ *B64D 11/0624* (2014.12); *H02J 4/00* (2013.01)

(58) Field of Classification Search
None
See application file for complete search history.

(56) References Cited

U.S. PATENT DOCUMENTS 8,141,946 B2    3/2012  Kramer
10,135,285 B2 * 11/2018 Ayotte .................. H02J 7/0013
(Continued)

FOREIGN PATENT DOCUMENTS

CA      2981392 A1 *  4/2018  ............ G01R 31/44
DE      696 11 855 T2   10/2001
(Continued)

OTHER PUBLICATIONS

German Search Report for Application No. 10 2019 108 218.8 dated Mar. 19, 2020.

*Primary Examiner* — Daniel Kessie
*Assistant Examiner* — Terrence R Willoughby
(74) *Attorney, Agent, or Firm* — Jenkins, Wilson, Taylor & Hunt, P.A.

(57) ABSTRACT

An aircraft seat having a voltage supply connection assigned only to the aircraft seat and/or at least one data connection assigned only to the aircraft seat, a voltage supply unit assigned to the aircraft seat and having a voltage input for connection to an on-board voltage network of an aircraft and at least one voltage output, each connected to another of the voltage supply connections. A switching arrangement is assigned only to the aircraft seat and connected between the voltage output and the voltage supply connection and/or between the data connection and a data network. A control unit is assigned only to the aircraft seat and connected to the switching arrangement. An infrared reading device is connected to the control unit and assigned only to the aircraft seat to wirelessly receive infrared signals from an external infrared transmitting device. The infrared reading device can receive infrared signals from a predetermined group of predetermined infrared signals, and the control unit can activate the voltage supply connections and/or at least one of the data connections by the switching arrangement, only in response to reception of a predetermined infrared signal.

11 Claims, 2 Drawing Sheets

(56) References Cited

U.S. PATENT DOCUMENTS

| | | |
|---|---|---|
| 2005/0021602 A1 | 1/2005 | Noel et al. |
| 2008/0122989 A1* | 5/2008 | Matsuki ............... G11B 31/003 |
| | | 386/E5.07 |
| 2016/0181841 A1 | 6/2016 | Reinert |
| 2020/0002004 A1 | 1/2020 | Koehn |
| 2020/0002005 A1 | 1/2020 | Bruchmann |

FOREIGN PATENT DOCUMENTS

| | | | |
|---|---|---|---|
| DE | 10 2004 037 674 A1 | 2/2006 | |
| DE | 10 2005 015 238 A1 | 10/2006 | |
| DE | 603 14 993 T2 | 5/2008 | |
| DE | 10 2009 014 083 A1 | 9/2010 | |
| DE | 10 2014 018 669 A1 | 6/2016 | |
| DE | 10 2018 115 471 A1 | 1/2020 | |
| DE | 10 2018 115 899 A1 | 1/2020 | |
| DE | 10 2018 115 900 A1 | 1/2020 | |
| EP | 0 739 816 B1 | 2/2001 | |
| EP | 3018788 A1 * | 5/2016 | ........... B60R 16/023 |
| WO | WO 99/04 381 A1 | 1/1999 | |

* cited by examiner

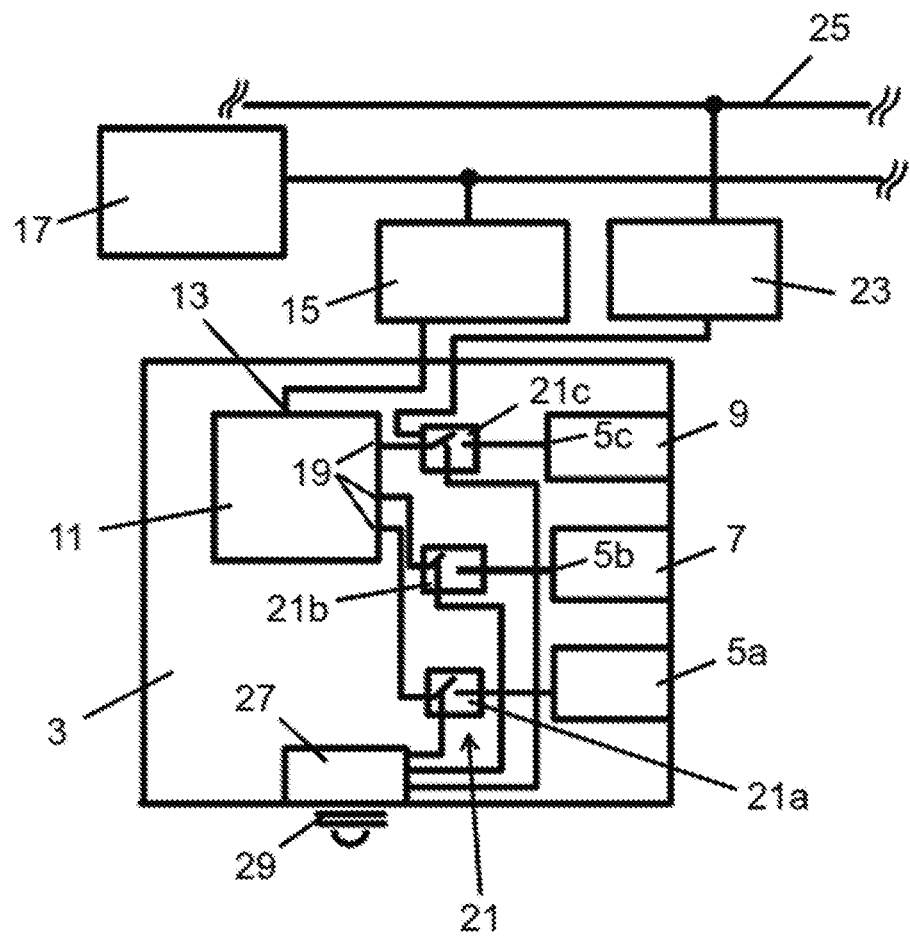
Fig. 3
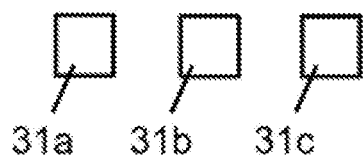

AIRCRAFT SEAT, AIRCRAFT SEAT ARRANGEMENT HAVING AN AIRCRAFT SEAT, AND AIRCRAFT HAVING AN AIRCRAFT SEAT ARRANGEMENT

CROSS-REFERENCE TO RELATED APPLICATION

This application claims priority to German Patent Application DE 10 2019 108 218.8 filed Mar. 29, 2019, the entire disclosure of which is incorporated by reference herein.

TECHNICAL FIELD

The present invention relates to an aircraft seat having at least one voltage supply connection assigned only to the aircraft seat and/or at least one data connection assigned only to the aircraft seat and a voltage supply unit which is assigned to the aircraft seat and has a voltage input for connection to an on-board voltage network of an aircraft and at least one voltage output, each of which is connected to another of the voltage supply connections. The present invention also relates to a seat arrangement having a plurality of such aircraft seats and to an aircraft having such an aircraft seat or such an aircraft seat arrangement.

BACKGROUND

Aircraft seats may have voltage supply connections and/or data connections which allow the respective passenger, for example, to connect electrical devices and thus to supply them with power and data on board. Such voltage supply connections and/or data connections can also be permanently connected to devices assigned to the aircraft seat and can supply them with power and/or data. An example of the latter devices is a screen of an on-board entertainment system. The voltage supply connections are usually connected to the on-board electrical system of the aircraft via a voltage supply unit. The voltage supply unit can convert the voltage from the on-board electrical system into a suitable output voltage in this case and, if a voltage supply unit is provided for a plurality of aircraft seats, can distribute the voltage from the on-board electrical system to the different voltage supply connections.

If the voltage supply connections and/or data connections of the aircraft seat can be selectively activated and deactivated, it is possible to individually provide the relevant passenger with an activated voltage supply connection and/or data connection at his aircraft seat for a fee. In this manner, the airfare can be kept low if the passenger does not require a voltage supply connection and/or data connection. Nevertheless, this service can be provided for those passengers who want it.

A central control system, such as, in particular, a central cabin management system (for example CIDS) is usually provided for the purpose of selectively activating and deactivating functions. It is then possible, for example, to configure the individual voltage supply connections and data connections or the voltage supply unit in such a manner that it/they can be connected to the central control system and can be controlled by the latter in order to selectively activate the individual voltage supply connections and/or data connections. In particular, in the case of airline companies offering low-price flights, the on-board technology provided for passenger comfort may be reduced for reasons of cost, however, and a connection of the voltage supply connections and data connections or of the voltage supply unit or of the passenger seat to a central control system or even actually a central control system may be absent. However, in such situations, in particular, it would be advantageous to be able to provide passengers with an activated voltage supply connection and/or data connection and the functionalities associated therewith for an extra charge.

SUMMARY

The object of the present invention is to provide an aircraft seat of the type mentioned at the outset which has a simple and cost-effective structure and can be operated in a simple and cost-effective manner and can be used to selectively activate the voltage supply connections and/or data connections, as well as an aircraft seat arrangement having a plurality of such aircraft seats and an aircraft having such an aircraft seat or such an aircraft seat arrangement.

The present invention provides an aircraft seat having one or more voltage supply connections assigned only to the aircraft seat and/or one or more data connections assigned only to the aircraft seat, a voltage supply unit, a switching arrangement assigned only to the aircraft seat, a control unit assigned only to the aircraft seat and an infrared reading device assigned only to the aircraft seat. In other words, the voltage supply connections, the data connections, the switching arrangement, the control unit and the infrared reading device are provided separately only for the aircraft seat and are not shared with other aircraft seats. Such an infrared reading device can also be referred to as an infrared receiving unit. It comprises (an) infrared detector unit(s) and is an interface which is involved in the conversion of infrared signals into other electrical signals. In contrast, the voltage supply unit can either be likewise assigned only to the aircraft seat and cannot be shared with other aircraft seats or else can be assigned to a plurality of aircraft seats and can perform the functions described below for said aircraft seats in an identical manner.

The voltage supply connections and the data connections or at least some of them are preferably part of the aircraft seat and, for example, are integrated in the latter itself, for example in an armrest of the aircraft seat. However, it is also possible to provide at least some voltage supply connections and the data connections in a manner spatially separate from the actual aircraft seat, for example on the rear side of a backrest of another aircraft seat which is then arranged, during use, in front of the relevant aircraft seat, for example for the purpose of supplying voltage and data to a screen integrated in the backrest of the seat in front.

The voltage supply unit, which can also be referred to as an in seat power supply unit, has a voltage input for connection to an on-board voltage network of an aircraft, in which the aircraft seat is intended to be installed, and one or more voltage outputs which are connected to the voltage input and each of which is connected to another of the voltage supply connections. Therefore, the number of voltage outputs is equal to the number of voltage supply connections. In this case, it should be noted that it is possible for the voltage supply unit to have yet further voltage outputs which are connected to further voltage supply connections of the aircraft seat. Each of the voltage outputs is adapted to output a voltage which is derived from a voltage applied to the voltage input.

The switching arrangement is connected between the voltage outputs and the voltage supply connections and between the data connections and a data network. It is therefore provided as a separate unit in a separate housing with respect to the voltage supply unit and is connected, as an external unit, to the voltage outputs of the voltage supply unit. In principle, however, the switching arrangement can also be arranged in the voltage supply unit in which the voltage supply connection would then also be integrated. The switching arrangement can be used to selectively activate and deactivate each of the voltage supply connections and each of the data connections individually or in groups, in particular by virtue of the fact that the connection to the assigned voltage supply output can accordingly be established either separately or in groups for each of the voltage outputs and the connection to the data network can accordingly be established either separately or in groups for each of the data connections. It is therefore possible, with the aid of the switching arrangement, to change over between a deactivated state, in which no voltage is applied to the voltage supply connection and/or no data are applied to the data connection, and an activated state, in which this is the case, individually or in groups for the voltage supply connections and the data connections.

The control unit is connected to the switching arrangement. It may have its own power supply or may preferably be connected to the voltage supply unit for power supply.

The infrared reading device is used to wirelessly receive infrared signals from an infrared transmitting device and is connected to the control unit. Communication based on infrared frequencies is particularly advantageous, in particular in an aircraft, since it has no risk with respect to electromagnetic compatibility (EMC) in contrast to other radio-based types of communication, for example Near Field Communication (NFC), Bluetooth, Wireless Avionics Intra-Communication (WAIC) or Wi-Fi. Furthermore, when using infrared light, there is also no need to take into account any radio standards for which country-dependent approvals or license fees arise. In addition, infrared-based communication bridges distances of several meters. In the present case, this could be, for example, the distance from the aisle to the window seat in an aircraft cabin or, for example, the distance between an aircraft monument (for example galley or lavatory) and a corresponding aircraft seat.

The infrared reading device is adapted to receive infrared signals from a predetermined group or a set of predetermined infrared signals. The number of predetermined infrared signals in the group is equal to the number of aircraft seats in the assembly. It is therefore possible for the group or set to contain only one predetermined infrared signal or two or more predetermined infrared signals. The infrared reading device and the control unit(s) are also adapted such that the control unit activates one or more of the voltage supply connections and/or one or more of the data connections by means of the switching arrangement, only in response to the reception of one of the predetermined infrared signals from an external infrared transmitting device which emits the respective predetermined infrared signal, on the basis of the received predetermined infrared signal. For this purpose, the control unit can immediately process, for example, a signal corresponding to the received infrared signal and forwarded by the infrared reading device and can generate a corresponding control signal for controlling the switching arrangement, or the infrared reading device can generate, on the basis of the received infrared signal, a first control signal for controlling the control units which in turn generate a second control signal for controlling the switching arrangement on the basis of this control.

In any case, the group of predetermined infrared signals is the same for each aircraft seat of this type. If a plurality of aircraft seats are provided, all aircraft seats are therefore controlled in an identical manner using the same predetermined infrared signals. As a result, it is possible, in a particularly simple manner, for the on-board personnel to selectively activate the power supply connections and/or data connections on the relevant aircraft seat for individual passengers desiring this. It is only necessary for the corresponding infrared signal of the predetermined infrared signals to be transmitted to the infrared reading device. For example, flight attendants can carry a limited number of external infrared transmitting devices, for example portable devices with an infrared interface, each of which is adapted to emit another of the predetermined infrared signals from the predetermined group. Only the infrared transmitting device corresponding to the desired activation must then be directed to the infrared reading device of the relevant assembly. Alternatively, the flight attendants can carry, for example, an apparatus which is adapted to selectively emit each of the predetermined infrared signals from the predetermined group, for example a mobile telephone equipped with an IR interface or a similar device.

The aircraft seat is therefore very simple to operate. At the same time, it has a simple and cost-effective structure since it is not necessary to connect it to a central control system or to provide such a control system at all. It is also easily possible to retrofit aircraft with the selective activation and deactivation of existing voltage supply connections and/or data connections. It is only necessary to provide the infrared reading device, the control unit and the switching arrangement.

In one preferred embodiment, each of the predetermined infrared signals in the predetermined group is assigned to another subset of the voltage supply connections and/or data connections. In this case, each subset may contain one or more of the voltage supply connections, one or more of the data connections or both one or more of the voltage supply connections and one or more of the data connections, for example one voltage supply connection and one data connection. The different subsets may share voltage supply connections and data connections. However, it is preferred if each of the voltage supply connections and each of the data connections respectively belongs only to one of the subsets. The infrared reading device and the control unit are adapted in such a manner that, upon receiving one of the predetermined infrared signals, the control unit controls the switching arrangement in such a manner that the latter activates the voltage supply connection and/or data connection assigned to the received infrared signal or the subset of the at least one voltage supply connection and/or of the at least one data connection assigned to the received infrared signal. This configuration has the advantage that different functions and/or devices which are assigned or connected to the individual connections or subsets can be selectively and separately activated. In this case, it is preferred if each of the subsets is assigned to another functionality or another device, wherein the corresponding devices are each preferably inseparably or permanently—or alternatively possibly also releasably—connected to the voltage supply connections and/or data connections of the respective subset. The functionalities and devices can preferably be selected, for example, from the group containing an on-board entertainment monitor, an audio output connection, a socket—possibly also different socket types from different countries—, a USB connection and a wireless power transmission device.

In one preferred embodiment, one or a plurality of the voltage supply connections is/are not permanently or inseparably connected to the device, but rather is/are provided for the connection of external devices by the passenger. In this case, it is possible to provide a plurality of such voltage supply connections which provide different voltages, for example 110 V AC or 5 V DC, and/or different types of plugs.

In one preferred embodiment, one, a plurality or all of the voltage supply connections is/are selected from the group containing a socket—possibly also different socket types from different countries—, a USB connection and a wireless power transmission device.

In one preferred embodiment, the infrared reading device and the control are part of an integral unit and, in particular, are formed as an integral unit, whereas the switching arrangement is provided as a separate unit, or the control unit and the switching arrangement are part of an integral unit and, in particular, are formed as an integral unit, whereas the infrared reading device is provided as a separate unit, or the infrared reading device, the control unit and the switching arrangement are part of an integral unit and, in particular, are formed as an integral unit. However, it is also possible for the infrared reading device, the control unit and the switching arrangement to each be part of separate units and, in particular, to be formed as separate units. Furthermore, in each of these cases, it is possible for the infrared reading device, the control unit and/or the switching arrangement to be integrated in a device which is connected, preferably permanently, to at least one of the voltage supply connections and/or to at least one of the data connections. The latter case makes retrofitting particularly simple.

In one preferred embodiment, the infrared reading device is adapted to interact with external infrared transmitting devices and to receive infrared signals. In this case, the external infrared transmitting devices may be, for example, mobile devices equipped with an infrared interface, for example mobile telephones or other suitable so-called "wearable devices", for example a smartwatch.

In one preferred embodiment, the voltage supply unit has a voltage converter and/or a distributor.

The present invention also provides an aircraft seat arrangement having a plurality of aircraft seats according to one of the embodiments described above. Each of the aircraft seats has the same voltage supply connections and data connections in this case. Furthermore, the predetermined infrared signals in the predetermined group are identical for each of the aircraft seats in the aircraft seat arrangement, and the control unit reacts in the same manner to the reception of infrared signals from the predetermined group for all aircraft seats in the aircraft seat arrangement.

The present invention also provides an aircraft having an aircraft seat according to one of the embodiments described above or having a seat arrangement according to one of the embodiments described above. In this case, it is possible for the aircraft to have a plurality of different aircraft seats or seat arrangements according to one of the embodiments described above.

In one preferred embodiment of the aircraft, the voltage supply unit, the control unit and the switching arrangement for each of the aircraft seats are separate from any central control systems, for example a central on-board management system, for centrally controlling functions in the cabin. If the aircraft has a central on-board management system, for example, the voltage supply unit, the control unit and the switching arrangement which are assigned to each of the aircraft seats are separate from the on-board management system. Alternatively, the aircraft does not have a central control system at all and, in particular, does not have an on-board management system.

BRIEF DESCRIPTION OF THE DRAWINGS

An exemplary embodiment of the invention is explained in more detail below with reference to the drawings.

FIG. 3 shows a schematic block diagram of an aircraft seat according to the embodiment shown in FIG. 2.

DETAILED DESCRIPTION

Figure 1:
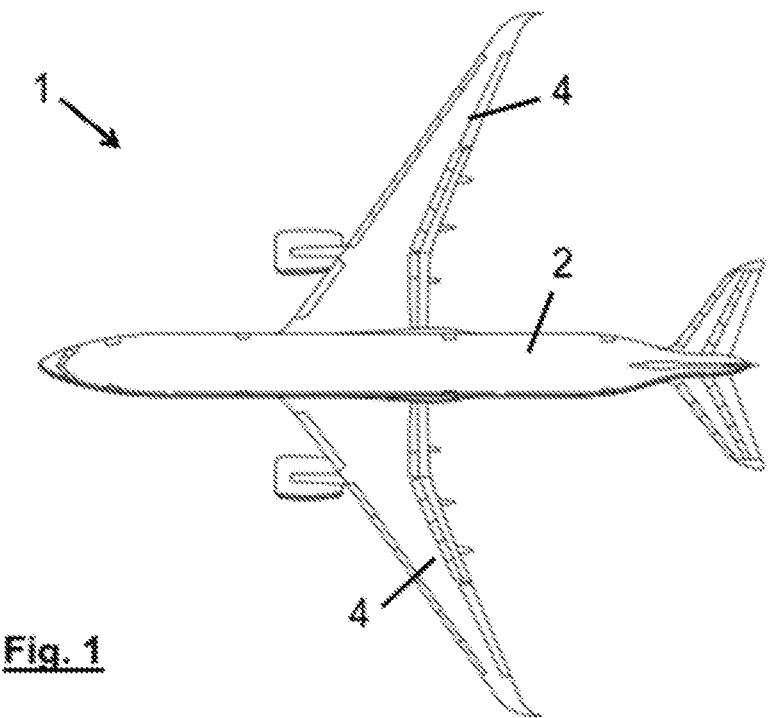
FIG. 1 shows a schematic view of an aircraft.
Figure 2:
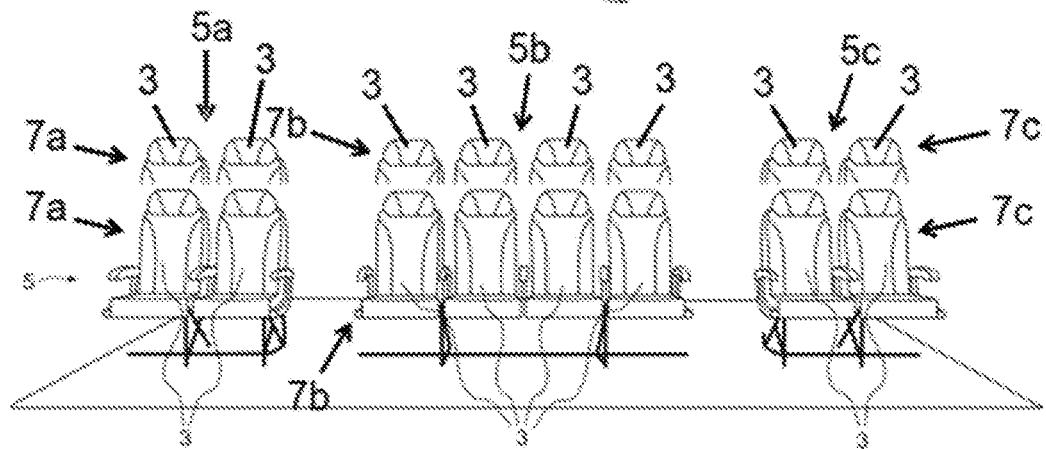
FIG. 2 shows a schematic perspective view of a plurality of aircraft seats in an aircraft seat arrangement according to one embodiment of the present invention.

The aircraft 1 shown in FIG. 1 has a fuselage 2 and two wings 4. A multiplicity of aircraft seats 3 are arranged inside the fuselage 2 in an overall arrangement 5 comprising three different aircraft seat arrangements 5a, 5b and 5c (see FIG. 2). In this case, the aircraft seat arrangements 5a and 5c are arranged on the two window sides and the aircraft seat arrangement 5b is arranged in the center between the two aircraft seat arrangements 5a and 5c. Each of the aircraft seat arrangements 5a, 5b, 5c respectively has a multiplicity of identical assemblies 7a, 7b and 7c positioned behind one another along the longitudinal axis of the aircraft 1.

One of the aircraft seats 3 is illustrated in FIG. 3 in the form of a schematic block diagram. The aircraft seat 3 has three connections 5a, 5b, 5c, the two lower connections 5a and 5b of which in FIG. 3 are voltage supply connections and the upper connection 5c of which is a combined voltage supply and data connection. The voltage supply connection 5a is, for example, in the form of a socket or USB connection for the connection and voltage supply of an external device by the passenger. An audio output 7 is permanently connected to the voltage supply connection 5b in order to provide audio functionality. A display apparatus 9 of an on-board entertainment system is permanently connected to the combined voltage supply and data connection 5c and is supplied with voltage and data via the connection 5c. The connections 5a and 5b and the audio output 7 can be integrated, for example, in an armrest of the respective aircraft seat 3. The display apparatus 9 may likewise be integrated in the aircraft seat 3 or may be integrated—possibly together with the connection 5c—in a backrest of a seat in front.

Each of the voltage supply connections 5a, 5b, 5c is connected in parallel with a voltage supply unit 11 which is assigned to the aircraft seat 3 and can share the aircraft seat 3 with other, identical aircraft seats. The voltage supply unit 11 is connected to an on-board electrical system 17 of the aircraft 1 via a voltage input 13 of the voltage supply unit 11 and via an external interface 15.

The voltage supply unit 11 has a separate voltage output 19 for each of the connections 5a, 5b and 5c. The aircraft seat 3 also has, separate from the voltage supply unit 11, a switching arrangement 21 which in turn has three switches 21a, 21b and 21c. Each of the switches 21a, 21b and 21c is connected between another of the voltage outputs 19 and the associated connection 5a, 5b and 5c, such that the switching arrangement 21 can be used to selectively change over each of the voltage supply outputs 5a, 5b and 5c between an activated state and a deactivated state. The switch 21c is also connected to a data network 25 of the aircraft 1 via an interface 23 and is arranged between the data network 25 and the data connection 5c. Therefore, the switching arrangement 21 can also be used to selectively change over the data connection 5c between an activated state and a deactivated state. In other words, the switching arrangement 21 can be used to selectively disconnect or establish the connection between the voltage supply connection 5a and one of the voltage outputs 19, between the voltage supply connection 5b and another of the voltage outputs 19 and between the combined voltage supply and data connection 5c and yet another of the voltage outputs 5c and the data network 25. In this case, the voltage supply unit 11 provides a voltage distributor and a voltage converter.

Each of the switches 21a, 21b and 21c of the switching arrangement 21 is connected to a combined control unit and infrared reading device 27 which is in turn connected to an infrared receiving device 29 and, in combination with the latter, is adapted to receive three predetermined infrared signals, each of which is or can be emitted by another of three infrared transmitting units 31a, 31b and 31c during operation. The combined control unit and infrared reading device 27 is adapted such that it outputs a corresponding control signal to the switches 21a, 21b, 21c only upon receiving one of the three predetermined infrared signals, that is to say only when one of the three infrared transmitting units 31a, 31b and 31c is temporarily brought into the immediate vicinity of the infrared receiving device 29. In this case, the respective control signal is characteristic of the respective infrared transmitting unit 31a, 31b and 31c, and the switching arrangement 21 is adapted to activate an assigned one of the connections 5a, 5b and 5c upon receiving one of the three possible control signals. These connections are deactivated as standard initially, that is to say at the beginning of a flight. In this case, the infrared transmitting unit 31a is assigned to the connection 5a, the infrared transmitting unit 31b is assigned to the connection 5b and the infrared transmitting unit 31c is assigned to the connection 5c.

In order to release one of the connections 5a, 5b and 5c and therefore a socket or a USB connection, the audio output 7 or the display apparatus 9 for a passenger on the aircraft seat on request, it is therefore only necessary for a flight attendant to select the correct infrared transmitting unit 31a, 31b and 31c and to direct it to the infrared receiving unit 29.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft seat having:
    at least one voltage supply connection assigned only to the aircraft seat and/or at least one data connection assigned only to the aircraft seat;
    a voltage supply unit which is assigned to the aircraft seat and has a voltage input for connection to an on-board voltage network of an aircraft and at least one voltage output, wherein each voltage output of the at least one voltage output is connected to a voltage supply connection of the at least one voltage supply connections;
    a switching arrangement assigned only to the aircraft seat and connected between the at least one voltage output and the at least one voltage supply connection and between the at least one data connection and a data network and configured to selectively activate and deactivate one or more of the at least one voltage supply connection or each of the at least one data connection;
    a control unit which is assigned only to the aircraft seat and is connected to the switching arrangement; and
    an infrared reading device which is connected to the control unit and is assigned only to the aircraft seat and configured to wirelessly receive infrared signals from an external infrared transmitting device;
    wherein the infrared reading device is configured to receive infrared signals from a group of predetermined infrared signals, and wherein the control unit is configured to activate or deactivate at least one of the at least one voltage supply connection and/or at least one of the at least one data connection by the switching arrangement in response to reception of one of the predetermined infrared signals.

2. The aircraft seat according to claim 1, in which each of the predetermined infrared signals in the group is assigned to a subset of the at least one voltage supply connection and/or of the at least one data connection, wherein the control unit is configured such that, upon receiving one of the predetermined infrared signals, the control unit controls the switching arrangement to activate or deactivate the subset of the at least one voltage supply connection and/or of the at least one data connection assigned to the received infrared signal.

3. The aircraft seat according to claim 2, in which each respective subset is associated with a different functionality or a different device which is inseparably connected to the voltage supply connections and/or data connections of the respective subset.

4. The aircraft seat according to claim 3, in which the functionalities and devices are selected from the group consisting of an on-board entertainment monitor, an audio output connection, a socket, a USB connection and a wireless power transmission device.

5. The aircraft seat according to claim 1, in which the infrared reading device, the control unit and/or the switching arrangement is/are part of an integral unit, or in which the infrared reading device, the control unit and/or the switching arrangement is/are separate units.

6. The aircraft seat according to claim 1, in which the voltage supply unit has a voltage converter and/or a distributor.

7. An aircraft seat arrangement having a plurality of aircraft seats according to claim 1, wherein each of the aircraft seats has the same voltage supply connections and data connections, the predetermined infrared signals in the group are identical for each of the aircraft seats in the aircraft seat arrangement, and the control unit is configured to react in a same manner to the reception of infrared signals from the group for all aircraft seats in the aircraft seat arrangement.

8. An aircraft having an aircraft seat according to claim 1.

9. An aircraft according to claim 8, in which the voltage supply unit, the control unit and the switching arrangement for each of the aircraft seats are separate from any central control systems for controlling functions in a cabin of the aircraft.

10. An aircraft having a seat arrangement according to claim 7.

11. An aircraft according to claim 10, in which the voltage supply unit, the control unit and the switching arrangement for each of the aircraft seats are separate from any central control systems for controlling functions in a cabin of the aircraft.

* * * * *